United States Patent [19]

Tardelius

[11] 4,098,124

[45] Jul. 4, 1978

[54] METHOD FOR MANUFACTURING THERMOMETERS AND A THERMOMETER MANUFACTURED ACCORDING TO THE METHOD

[76] Inventor: Klas Torsten Hjalmar Tardelius, Heleneborgsgatan 17, Stockholm, Sweden, S-117 81

[21] Appl. No.: 765,412

[22] Filed: Feb. 3, 1977

Related U.S. Application Data

[63] Continuation of Ser. No. 615,905, Sep. 23, 1975, abandoned.

[30] Foreign Application Priority Data

Sep. 26, 1974 [SE] Sweden .............................. 7412099

[51] Int. Cl.² .............................................. G01K 1/00
[52] U.S. Cl. ......................................... 73/371; 73/1 F
[58] Field of Search ....................... 73/371, 1 F, 37.5; 156/306

[56] References Cited

FOREIGN PATENT DOCUMENTS 1,573,309  11/1969   Fed. Rep. of Germany ......... 73/371

*Primary Examiner*—Donald O. Woodiel
*Attorney, Agent, or Firm*—Holman and Stern

[57] ABSTRACT

A method for manufacturing thermometers and a thermometer manufactured according to the method, in which a number of capillary tubes and containers (thermometer balls) are premeasured with regard to inside volume by means of a vacuum measurement instrument, thereafter being stored in groups, each group having a specific inside volume, said capillary tubes and containers for a liquid medium, e.g. mercury, being matched to a thermometer by using containers with a specific inside volume together with capillary pipes of a second specific volume, said first and second volume being precalculated in order to achieve a specific range of temperature and capillary height for any temperature within said range of temperature.

3 Claims, 5 Drawing Figures

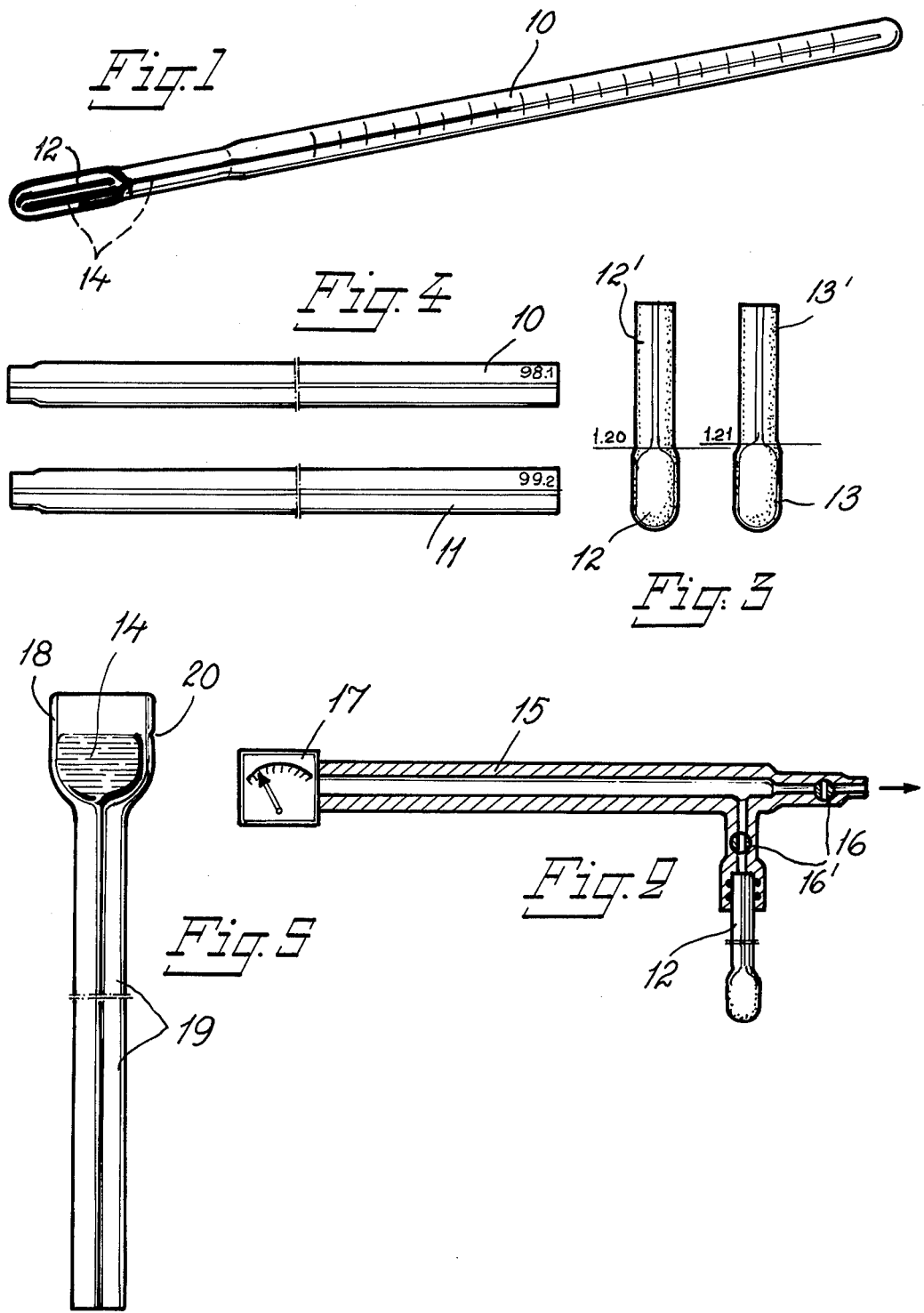

METHOD FOR MANUFACTURING THERMOMETERS AND A THERMOMETER MANUFACTURED ACCORDING TO THE METHOD

This is a continuation of application Ser. No. 615,905, filed Sept. 23, 1975, now abandoned.

FIELD OF THE INVENTION

The present invention relates to a method for manufacturing thermometers of glass, plastics or materials with similar properties. The invention also relates to a thermometer manufactured according to the method.

BACKGROUND OF THE INVENTION

When previously manufacturing thermometers of the above type, capillary tubes of glass have been used. Said capillary tubes have normally a length of approximately 300 mm and it is necessary to measure the inside volume of each capillary tube, in order to exactly determine the raising height of the fluid medium, e.g. mercury. In order to accomplish said measurement, a predetermined amount of mercury is entered in the channel of the capillary tube, said tube being open at least at one end portion. For this purpose a measuring glass is used, in which approximately 9 g mercury is a 1-measurement. The measuring glass is graded from e.g. 0.25-measurement to 3-measurement. All calculations are based on a temperature of 100° C. If a 1-measurement of mercury extends 130 mm in a capillary tube, it has an extension, i.e. grading length, of 130 mm for 100° C.

A container, e.g. ball shaped, of the same material as the capillary tube, is arranged to be attached at the open end portion of said tube by means of a melting method. Said container is referred to as a ball, i.e. a thermometer ball, in which the liquid medium, e.g. mercury, is contained. Said ball is arranged for a certain volume of mercury, e.g. a ball measurement of 1,00 with a capillary tube having a length of 130 mm and a ball with a ball measurement of 1,00, can be used for manufacture of a thermometer covering 0°–100° C, having a graded length of 130 mm. Other gradings are determined proportionaly. If a graded length of e.g. 0°–200° C is desired with a graded length of 130 mm, a capillary tube having 65 mm extension and a ball with a ball measurement of 1,00 must be used. A ball measurement of 1,00 results in 0°–100° C in a graded length of 130 mm. When using a ball measurement of 2,00, a capillary tube of 65 mm must be used for the same grading and grading length. It is thus possible to vary the volume of the capillary tube and the ball measurement in order to obtain desired grading length and temperature range, since the capillary tube volume always is related to the measurement of the ball. When the measurement of the ball and the capillary tube volume have been desired, the ball is melted on to the capillary tube, whereafter the predetermined volume of mercury is poured into the open end of the ball, and the volume poured is marked by means of a glass cutter or similar on the thermometer ball. The mercury is thereafter poured away and the opening of the thermometer ball is melted together, as close as possible to the mark, in order to give the ball a volume corresponding to the predetermined volume of mercury. Utilizing this manual method, it is not possible to achieve an exact ball volume, which means that certain changes in the grades length are unavoidable. This makes it necessary to use an individually graded scale for each thermometer. When using decals for e.g. thermometers for gift purposes, often 5–10 decals with different graded lengths must be used in order to achieve a reasonable result of grading for the manufactured thermometers. The liquid medium e.g. mercury, is filled into the capillary tube and the thermometer ball by means of heating, vacuum pressure and melting in a previously known way.

In order to reduce the manual part of the manufacturing as much as possible and to make it possible to manufacture exactly indicating thermometers, the method of manufacturing according to the present invention has been developed.

SUMMARY OF THE INVENTION

The method according to the present invention can be used for thermometers comprising a capillary tube which can be graded and a container, i.e. ball, for a liquid medium, e.g. mercury, melted to the one end portion of said pipe, part of said medium being arranged to move in the length direction of the capillary tube under influence of temperature changes surrounding the container or ball, said method being mainly characteristic thereof, that a number of containers or balls are manufactured, whereafter the inside volume of each container or ball is measured and thereafter placed in volume marked storing shelves, in such a way, that containers or balls having the same inside volume are placed in the same storing shelf, whereafter containers or balls having a fixed inside volume measurement are melted together with gradable capillary tubes having an inside volume measurement in relation to the inside volume of the containers or balls.

The method is further characteristic therof, that the inside volume measurement of the containers or balls and the capillary tubes are measured by means of a vacuum measurement instrument, indicating the inside volume measurement of each container or ball and capillary tube.

A thermometer manufactured according to the method is mainly characteristic thereof, that the volume measurement of the manufactured container or ball is fixed in relation to the volume measurement of the gradable capillary tube, before the container or ball and the capillary tube are melted together.

The method and thermometers manufactured according to the method, will be more fully described below with reference to the accompanying drawing.

BRIEF DESCRIPTION OF THE DRAWING

FIG. 1 shows a perspective view of a thermometer, manufactured according to the method.

FIG. 2 shows a principle view, partly in cross-section, of a vacuum measurement instrument, by which the inside volume of the container or ball, as well as the inside volume of the capillary tube, can be measured.

FIG. 3 shows a view of the two containers or balls having different volume measurments.

FIG. 4 shows a view of two capillary tubes having different volume measurements.

FIG. 5 shows a view, partly in cross-section, of a container or ball attached to a capillary tube, according to a previously known method.

DESCRIPTION OF A PREFERRED EMBODIMENT

By 10 and 11 respectively are indicated capillary tubes having different inside volume measurements and by 12 and 13 respectively are indicated containers having different inside volume measurements. Reference numeral 14 indicates the fluid medium, e.g. mercury. A vacuum measurement instrument is in general indicated by 15, arranged with two valve members 16, 16' and a volume scale 17, said instrument 15 being arranged for measurement of the inside volume of each separate container, or ball, and capillary tube.

FIG. 5 is intended to show the previously known method for measurement of the inside volume in a container or ball 18 and a capillary tube 19, said container or ball 18 being open at one free end portion for filling and pouring out of the previously decided volume of liquid medium 14, the horizontal surface of which is marked by means of a mark 20 in the outside surface of the container or ball 18. The open portion of the container or ball 18 is closed by means of melting at the mark 20, a method unable to give an exact volume fixation of the inside volume of the container or ball 18.

According to the invention every container or ball 12, 13 is arranged with a raising tube 12' and 13' respectively, preferably having the same cross-sectional area as the capillary tubes 10, 11, in order to make it possible to join same with out any visable marks. The containers or balls 12, 13 with the raising tubes 12', 13' are manufactured as separate units and completely closed at the free end portions, as shown in FIG. 3. When manufacturing thermometers according to the method, the inside volume of each container or ball 12, 13 with raising tube 12' 13' and capillary tube 10, 11, are first determined. When said volume has been exactly determined, the containers or balls 12, 13 and capillary tubes 10, 11 with the same inside volume are placed in storage shelves marked with corresponding volumes. Since an exactly measured container or ball 12, 13 results in an exact graded length or scale, it is possible to melt a container or ball of a specific volume to a capillary tube of specific volume, whereby a thermometer having an inside volume in relation to a predetermined graded length or scale is achieved. There is no need for post adjustment of grading scales to the inside total volume of the thermometer, which means that the manufacturing method is considerably simplified. It is possible to use only one graded length or scale length instead of, as previously, a number of lengths.

An example of manufacture is given below:

A number of thermometers are to be manufactured having a grading $-10 + 100°$ C and a graded length of 130 mm. This is based on: $-10 + 10°$ C = 130 mm. $100°$ C = $x$ and $x = 118.18$. A container or ball having a ball measurement of 1,00 and a capillary tube of 118.18 results in $-10 + 100°$ C on a graded length of 130 mm.

If a container or ball having a ball measurement of 1.20 is to be used, it is possible to calculate the size of the capillary tube to be melted together with the container or ball in order to achieve $-10 + 100°$ C on a graded length of 130 mm as follows:

$$118.8/x = 120 \quad x = 98.5$$

A container or ball having a ball measurement of 1.20 and a capillary pipe of 98.5 are used and melted together. When filled with mercury said thermometer results in the desired grading $-10 + 100°$ C on a graded length of 130 mm. The liquid medium e.g. mercury, is filled as previously known by means of heat, vacuum and melting together the thermometers end portions, and said method is therefore not described.

I claim:

1. The method for manufacturing thermometers, obviating post-calibtation of the thermometer, comprising the steps of:
    a. producing graded capillary tubes from a material such as glass, plastic, or the like and determining the internal volumes thereof as a function of graded lengths in relation to a bulb measurement of 1.0 equal to a predetermined standard bulb volume;
    b. providing predetermined graduated temperature scales along the graded lengths of the capillary tubes;
    c. producing bulbs from a material compatible to that from which said graded capillary tubes are produced for connection to the tubes and for containing a liquid medium such as mercury, or the like, which, when subject to temperature changes reflect temperature changes, measuring the internal volumes of the bulbs in order to ascertain relationships within 0.01 to said bulb measurement of 1.0;
    d. matching the internal volumes of the bulbs and the capillary tubes according to the formula:

$$\frac{\text{Graded length for } 100°}{\text{Capillary tube [No.] graded length}} = \text{Bulb [vol.] volume relationship within 0.01 to said bulb measurement of 1.0}$$

in which the capillary tube graded length is obtained for a given bulb volume, or vise versa, thus obviating calibration of the thermometer;
    e. connecting the matched bulbs and graded capillary tubes for producing thermometers without requiring post-adjustment of the graduated temperature scales.

2. The method for manufacturing thermometers as set forth in claim 1, including measuring the internal volume of the capillary tubes and bulbs by applying a vacuum of known value to the respective capillary tubes and bulbs.

3. The method as claimed in claim 1 including terminally-sealing the graded capillary tubes and bulbs after having matched the same; and joining the matched bulbs and graded capillary tubes by melting the same so that the internal volumes of the capillary tubes and bulbs remain in communication.

* * * * *